United States Patent
Shimada et al.

(10) Patent No.: US 6,628,755 B2
(45) Date of Patent: Sep. 30, 2003

(54) TRANSACTION SUPPORT SYSTEM AND INFORMATION TERMINAL UNIT CONNECTING THERETO

(75) Inventors: Takashi Shimada, Kawasaki (JP); Kiyofumi Akita, Kawasaki (JP); Shigeru Idei, Kawasaki (JP); Shinichi Tanaka, Matsuyama (JP); Keizo Nishi, Hirakata (JP); Muneichi Tsujibayashi, Izumi (JP)

(73) Assignees: Fujitsu Limited, Kawasaki (JP); The Senshu Bank, Ltd., Kishiwada (JP)

( * ) Notice: Subject to any disclaimer, the term of this patent is extended or adjusted under 35 U.S.C. 154(b) by 0 days.

(21) Appl. No.: 09/438,409

(22) Filed: Nov. 12, 1999

(65) Prior Publication Data

US 2002/0057775 A1 May 16, 2002

(30) Foreign Application Priority Data

Dec. 4, 1998 (JP) .......................................... 10-345954

(51) Int. Cl.⁷ .............................. H04M 1/24; H04M 3/00
(52) U.S. Cl. ................. 379/9.04; 379/9.03; 379/93.17; 379/265.01; 379/265.02; 379/265.09; 379/142.01; 379/9
(58) Field of Search ............................. 379/142, 93.12, 379/91.01, 93.17, 201, 207, 211, 223, 265, 9.03, 9.04, 142.07, 142.16, 201.01, 201.04, 211.01, 211.02, 265.01, 265.02, 265.03, 265.04, 265.09, 266.01

(56) References Cited

U.S. PATENT DOCUMENTS

| | | | | |
|---|---|---|---|---|
| 4,425,625 A | | 1/1984 | Seligman et al. | |
| 5,181,239 A | * | 1/1993 | Jolissaint | 379/96 |
| 5,774,663 A | * | 6/1998 | Randle et al. | 395/200.34 |
| 5,778,060 A | * | 7/1998 | Otto | 379/265 |
| 5,793,861 A | * | 8/1998 | Haigh | 379/266 |
| 5,799,061 A | * | 8/1998 | Melcher et al. | 379/45 |
| 6,073,119 A | * | 6/2000 | Bornemisza-Wahr et al. | 705/42 |
| 6,128,380 A | * | 10/2000 | Shaffer et al. | 379/265 |
| 6,154,782 A | * | 11/2000 | Kawaguchi et al. | 709/239 |
| 6,195,420 B1 | * | 2/2001 | Tognazzini | 379/130 |
| 6,230,287 B1 | * | 5/2001 | Pinard et al. | 714/31 |
| 6,396,919 B1 | * | 5/2002 | Shimada et al. | 379/265.12 |

FOREIGN PATENT DOCUMENTS

| | | |
|---|---|---|
| GB | 2 329 046 | 3/1999 |
| JP | 61228765 | 10/1986 |
| JP | 07044635 | 2/1995 |
| JP | 07095304 | 4/1995 |
| JP | 10-11399 | 1/1998 |
| JP | 10040447 | 2/1998 |
| JP | 11346266 | 12/1999 |

\* cited by examiner

Primary Examiner—Huyen Le
Assistant Examiner—Quoc D. Tran
(74) Attorney, Agent, or Firm—Staas & Halsey LLP

(57) ABSTRACT

The present invention discloses a transaction support system for processing information from an information terminal unit provided together with a telephone. In the transaction support system, an information storing part stores terminal information concerning a process performed in the information terminal unit, the terminal information corresponding to telephone information identifying the telephone. Then, a displaying part displays the terminal information corresponding to the telephone information when a call from the telephone is received.

11 Claims, 9 Drawing Sheets

FIG. 5

⟨TRANSACTION LOG⟩

| TEL_NO | TRAN_CNT | UPDDATE | UPDTIME | LOG_TOYE | LOG_INFO |
|---|---|---|---|---|---|
| 0724111111 | 1 | 19980523 | 13474271 | 01 | 0724301014 |
| 0724111111 | 1 | 19980523 | 13475414 | 02 | W:¥HOW¥SC¥RES¥NS732 |
| 0724111111 | 1 | 19980523 | 13475417 | 03 | 0724301014 5001199805231347S4A00720000TEST          ACCOUNT A |
| 0724111111 | 1 | 19980523 | 13454842 | 01 | 0724301014 1000199805231345A4E000510001 |
| 0724111111 | 1 | 19980523 | 13441787 | 03 | 0724301014 5001199805231344I7A00720000TEST          ACCOUNT A |
| 0724111112 | 5 | 19980522 | 16005275 | 01 | 0724301015 1000199805221600S5E007720000 LINE IS NOW BUSY. PLEASE TRY AGAIN FROM THE BEGINNING. THANK YOU |
| 0724111112 | 5 | 19980522 | 16013754 | 01 | 0724301015 1000199805221601A0E000510001 |
| 0724111113 | 1 | 19980522 | 16132515 | 01 | 0724301014 1000199805221613O2E000510000 |

F I G. 6

<STATUS TABLE>

| TEL NO. (KEY) | TERMINAL LOCATION NO. | LOCATION NO. | LOCATION NAME | MACHINE NO. | OPERATION START DATE | SCREEN ID | TRANSACTION COUNTER | LINE STATUS FLAG | ACCOUNT INFORMATION AND OTHERS | UPDATE DATE | UPDATE TIME |
|---|---|---|---|---|---|---|---|---|---|---|---|
| 0724111111 | 731 | 068 | ATM AT XX BRANCH | 01 | 19980101 | 1020 | 10 | 0 | ... | 19980523 | 130745 |
| 0724111112 | 732 | 001 | CONVENIENCE STORE A | 02 | 19980101 | 1000 | 100 | 0 | ... | 19980523 | 134928 |
| 0724111113 | 734 | 078 | ATM AT XX BRANCH | 03 | 19980518 | 1030 | 130 | 0 | ... | 19980523 | 144647 |

TRANSACTION SUPPORT SYSTEM AND INFORMATION TERMINAL UNIT CONNECTING THERETO

BACKGROUND OF THE INVENTION

1. Field of the Invention

The present invention generally relates to transaction support systems for processing transactions, and more particularly to a transaction support system that supports various kinds of business transactions such as a banking service, a securities service or the like based on input information from a terminal unit located outside.

2. Description of the Related Art

Conventionally, based on input information from an ATM (Automatic Teller Machine) provided at banks, a customer authentication is performed and then a banking transaction such as a deposit, a withdrawal, an account transfer and so on is performed. In this system, it is not required for customers to visit a counter in a bank for banking transactions.

Also, recently, a system processing banking transactions via a telephone such as a telephone banking system is provided. In this system, for example, when a customer gives a customer service representative of a bank information identifying the customer and the customer's account such as the customer's name and address, an account number, a password or the like, the customer service representative inputs the information into a computer terminal. After the customer authentication based on the information input from the computer terminal, the customer service representative inputs information of a transaction such as an account transfer indicated by the customer via the telephone. Then, the input information is sent to a host computer to process the customer's desired transaction.

In addition, in this telephone banking system, the customer can consult with the customer service representative about a transaction. For example, it is assumed that the customer consults with the customer service representative of the bank about a housing loan and provides necessary information regarding the housing loan. The customer service representative inputs the information received from the customer into the computer terminal. Then, information for a customer's desired transaction is retrieved based on the input information from information accumulated in such as a server computer.

In the system using the ATM as mentioned above, for example, in a case in which the customer using the ATM needs an explanation to operate the ATM at the bank, the customer asks the customer service representative in the bank to come to see a current screen of the ATM. The customer service representative directly explains to the customer about operations so that the customer can operate the ATM for the desired transaction. Disadvantageously, when no customer service representative is available in this case, the customer can not receive personal help about the operation. In addition, disadvantageously, when the customer uses another ATM located far away from the bank, it is difficult for the customer to get detailed information about how to operate the current screen.

Moreover, the system using the ATM is used for a deposit, a withdrawal, an account transfer or the like transaction, but the system is not designed for the customer to consult with a customer service representative about details of the customer's desired transaction.

Furthermore, in such as a telephone banking system, it is required for the customer service representative to input information provided by the customer via the telephone to the computer terminal connecting to the host computer. Thus, to input information via the telephone consumes much time.

SUMMARY OF THE INVENTION

It is a general object of the present invention to provide a transaction support system in which the above-mentioned problems are eliminated and a speedy service can be provided to a customer based on input information and terminal status information from the customer's terminal unit.

A more specific object of the present invention is to provide a transaction support system in which input information and terminal status information from a customer's terminal unit can be displayed when a call from a telephone provided together with the customer's terminal unit is received.

The above objects of the present invention are achieved by a transaction support system connected to at least one information terminal unit through one line and separately connected to at least one telephone provided together with the information terminal unit through another line, the transaction support system including: an information storing part storing terminal information concerning a process performed in the information terminal unit, the terminal information corresponding to telephone information identifying the telephone; and a displaying part displaying the terminal information corresponding to the telephone information, which terminal information is stored by the information storing part, when a call from the telephone is received.

According to the present invention, the information transmitted from the information terminal unit can be displayed when a call from the telephone provided together with the information terminal unit is received. Therefore, an operator using the transaction support system can quickly understand a situation of the information terminal unit so that the operator can advise a user using the information terminal unit without asking the user about the situation.

The above objects of the present invention are achieved by an information terminal unit connected through a line to the transaction support system, the information terminal unit including: an information accumulating part accumulating journal information in digital data, which journal information includes transaction information produced based on input information and customer information.

According to the present invention, the information terminal unit can accumulate the journal information including transaction information produced based on input information and customer information.

BRIEF DESCRIPTION OF THE DRAWINGS

Other objects, features and advantages of the present invention will become more apparent from the following detailed description when read in conjunction with the accompanying drawings, in which:

FIG. 5 is a diagram showing an example of a structure of a transaction log;

FIG. 6 is a diagram showing an example of a structure of a status table.

DESCRIPTION OF THE PREFERRED EMBODIMENTS

Figure 1:
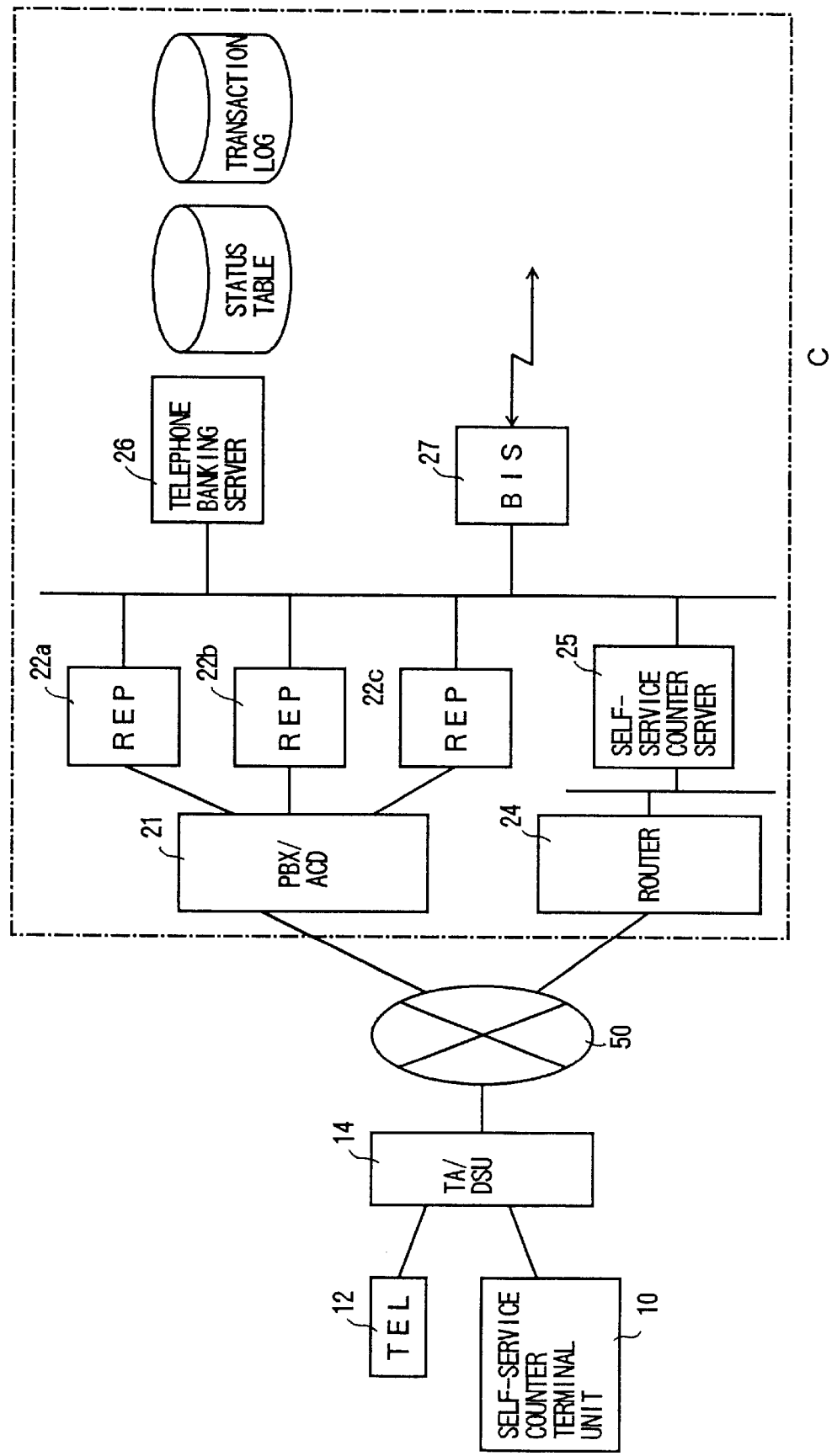
FIG. 1 is a block diagram showing a transaction support system according to an embodiment of the present invention.

A transaction support system according to an embodiment of the present invention can be, for example, constructed as shown in FIG. 1.

In FIG. 1, the transaction support system is constructed in a call center C. For example, at a bank, a convenience store, a department store, a station or the like, a self-service counter terminal unit 10 (information terminal unit) and a customer telephone 12 are provided together. The self-service counter terminal unit 10 includes the following functions: a reading information function to read information from an input unit or a card such as a magnetic card, an IC card or the like operated by a customer, a sending information function to send information inputted from the card or the input unit to the call center C via a public switching telephone network 50, a receiving information function to receive information from the call center C, a processing information function to process information by a desired transaction method and a displaying information function to display processed information. Also, the self-service counter terminal unit 10 includes a memory for storing journal information that will be explained later. The self-service counter terminal unit 10 and the customer telephone 12 are connected to the public switching telephone network 50 via a TA (Terminal Adapter)/DSU (Digital Service Unit) unit 14 and are further separately connected to the call center C via different lines of the public switching telephone network 50.

The transaction support system constructed in the call center C includes an exchange 21, a router 24, reception terminal units 22a, 22b and 22c, a self-service counter server 25, a telephone server 26 and a communication server (BIS) 27. The exchange 21 includes an automatic call distributor (ACD) to distribute calls received from a plurality of the customer telephones 12 via the public switching telephone network 50 to the reception terminal units 22a, 22b and 22c. Each of the reception terminal units 22a, 22b and 22c includes a telecommunication function and a data communication function to communicate with each of the self-service counter server 25, the telephone server 26 and the communication server (BIS) 27.

Figure 2:
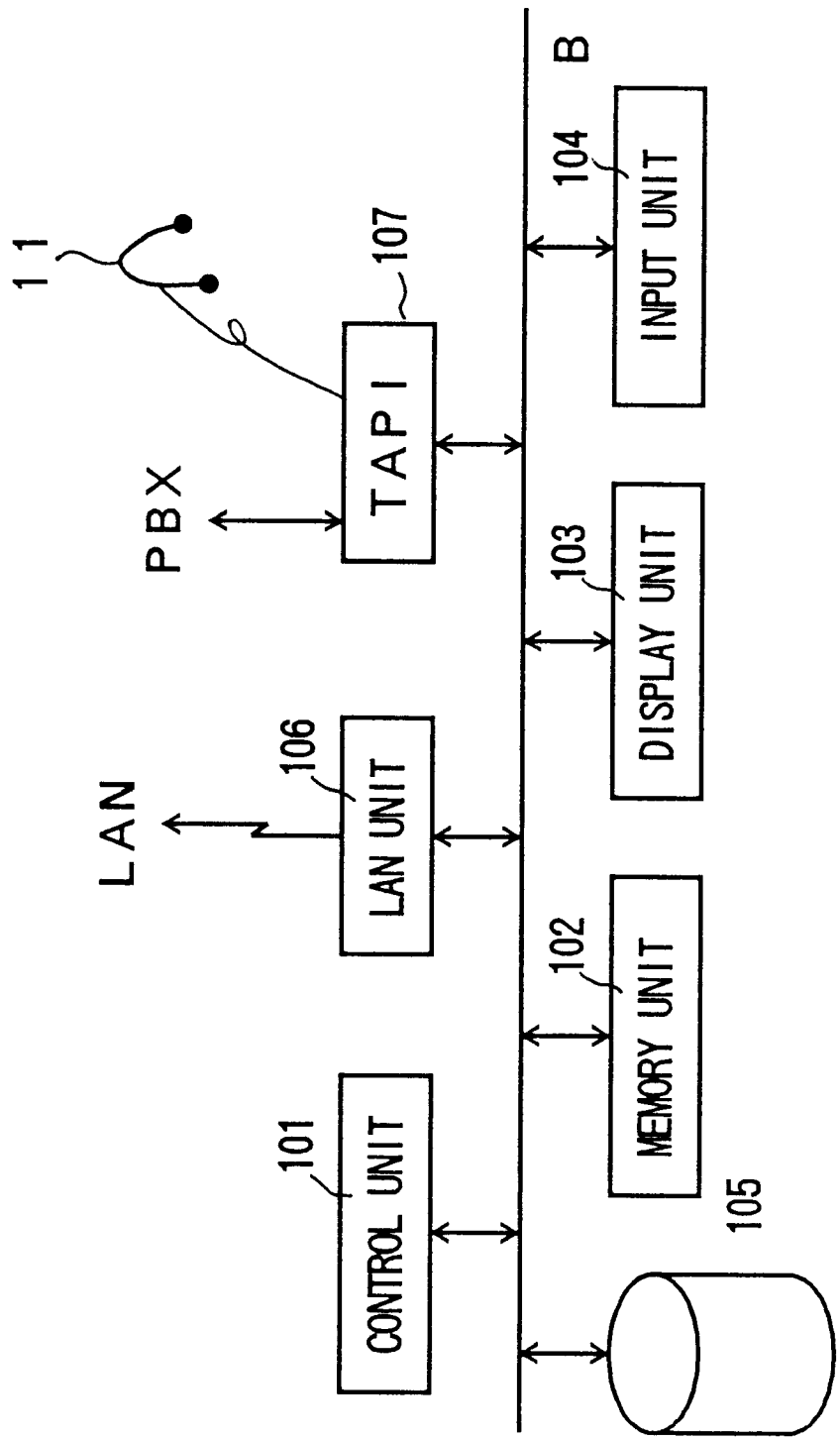
FIG. 2 is a block diagram showing an example of a construction of a reception terminal unit provided in the transaction support system.

For example, each of the reception terminal units 22a, 22b and 22c is constructed as shown in FIG. 2.

In FIG. 2, each reception terminal unit includes a control unit 101 including a CPU, a memory unit 102, a display unit 103, an input unit 104, a disk unit 105, a LAN unit 106 and an internal telephone unit 107. These units are mutually connected via a bus.

The control unit 101 controls the whole reception terminal unit and also executes processes to receive transaction requests from customers. The memory unit 102 includes a memory such as a RAM, a ROM or the like and stores programs that are executed by the control unit 101 and data needed in processes. The display unit 103 is constructed by a CRT, a LCD or the like so as to display various guidance for an operator as a customer service representative, information about a customer and screen information displayed at the self-service counter terminal unit 10 that will be explained later. The input unit 104 includes a keyboard, a mouse or the like for the operator to input information in the reception terminal unit 22a, 22b or 22c.

The LAN unit 106 is connected to a LAN for data communications with the servers 25, 26 and 27. The internal telephone unit 107 (TAPI) is connected to the exchange 21 for a voice communication with the exchange 21. In addition, a telephone head set 11 is connected to the internal telephone unit 107. The operator receives calls from customers by using the telephone head set 11.

The self-service counter server 25 relays input information from the self-service counter terminal unit 10 to the telephone banking server 26 via the router 24. Also, the self-service counter server 25 relays information from the telephone banking server 26 to the router 24 in order to forward the information to the self-service counter terminal unit 10 connecting to the router 24.

For example, the communication server 27 is connected to a host computer in a bank so that data communications are performed between the communication server 27 and the host computer in the bank.

The telephone banking server 26 includes various databases and sets up each database to fit requirements. At least one database includes a transaction log to accumulate transaction data concerning transaction processes based on input information from the self-service counter terminal unit 10 and a status table to store status information identifying a current screen of the self-service counter terminal unit 10. The transaction data is obtained based on the input information from the self-service counter terminal unit 10. The transaction data is accumulated in the transaction log and corresponds to a telephone number identifying the customer telephone 12 that is used with the self-service counter terminal unit 10. Any information derived form the input information from the self-service counter terminal unit 10 can be the transaction data stored in the transaction log. That is, for example, information concerning a customer's desired transaction, information obtained during the transaction processes carrying out the customer's desired transaction, an operation log to obtain the input information or similar information can be stored as the transaction data in the transaction log.

The status information stored in the status table also corresponds to the telephone number identifying the customer telephone.

A transaction process, such as a banking transaction, performed in the system mentioned above will now be explained.

When a customer inserts a card into the self-service counter terminal unit 10, information including a personal identification number (PIN), which is electrically or magnetically stored in the card and identifies the customer, is retrieved. An authentication request for the information including the PIN is supplied to the self-service counter server 25 via the public switching telephone network 50 from the self-service counter terminal unit 10. Then, based on the card authentication request shown in FIG. 3, the self-service counter server 25 generates an authentication input message (hereinafter called an authentication IPM) and sends the authentication IPM via the telephone banking server 26 and the communication server 27 so as to connect to the host computer. After the host computer authenticates the customer based on the PIN, the host computer sends an authentication output message (hereinafter called an authentication OPM) as a result of the authentication to the telephone banking server 26 via the communication server 27. When receiving the authentication OPM, the telephone banking server 26 generates a response file corresponding to the authentication OPM and supplies the response file to the self-service counter server 25. After that, the self-service counter server 25 sends an authentication response, which is used to respond to the authentication request based on the response file, to the self-service counter terminal unit 10 via the public switching telephone network 50.

When the authentication response shows that the customer is authenticated, for example, a menu screen is displayed at the self-service counter terminal unit 10 for the customer to select a desired transaction type. On the other hand, when the authentication response shows that the customer is not authenticated, a message showing 'no transaction available' is displayed at the self-service counter terminal unit 10 and the process at the self-service counter terminal unit 10 is terminated.

In a case in which the customer is authenticated as mentioned above, when the customer selects one of transaction types from the menu displayed at the self-service counter terminal unit 10, a specific transaction is processed.

Figure 3:
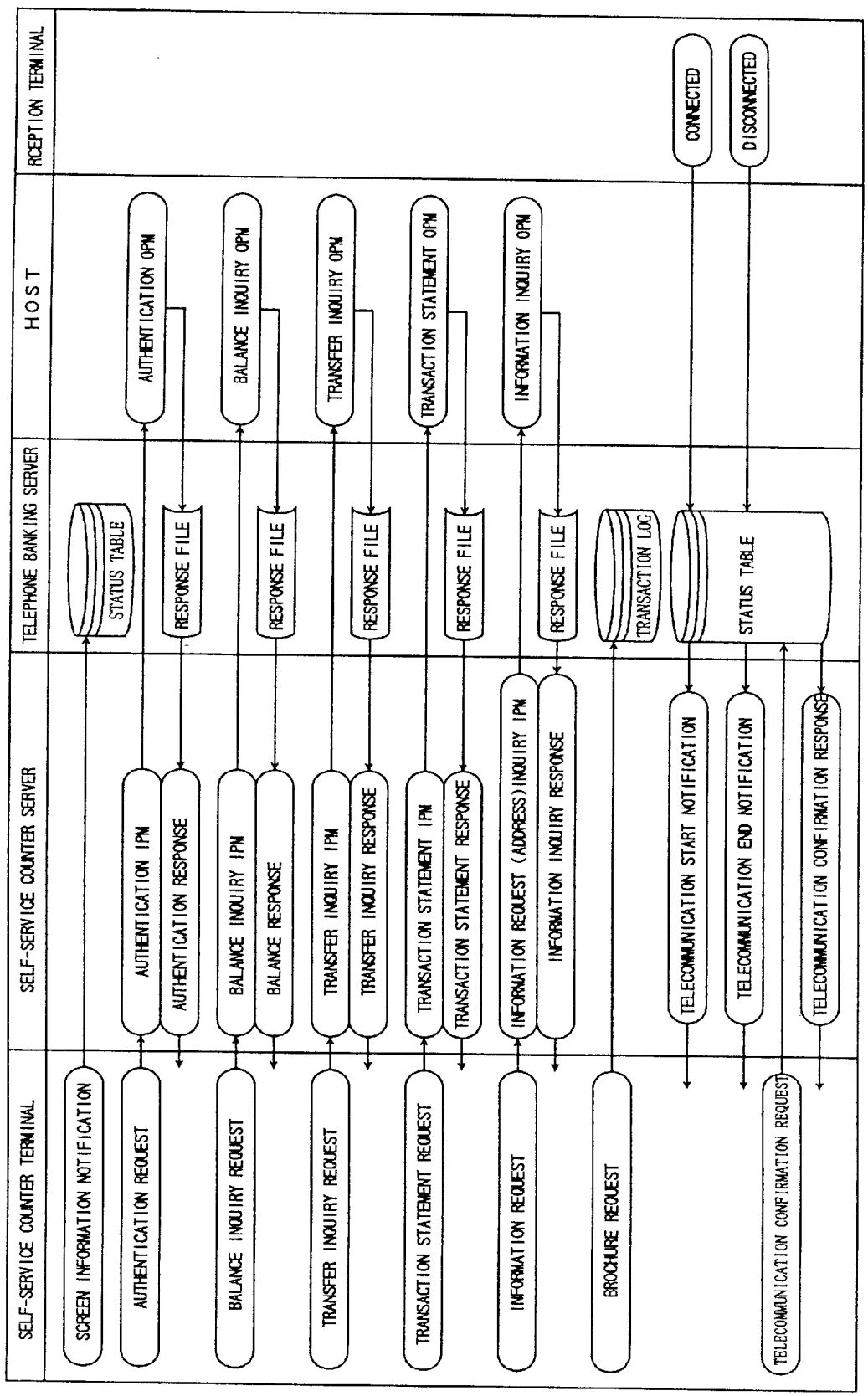
FIG. 3 is a diagram showing information flows among a self-service counter terminal unit, the transaction support system and a host computer.

For example, in a case in which a banking transaction such as an account balance inquiry, an account transfer inquiry, a transaction statement, an information request or the like is performed, as shown in FIG. 3, one transaction request such as a balance inquiry request, a transfer inquiry request, a transaction statement request, an information request or the like in accordance with a selected transaction type is sent from the self-service counter terminal unit 10 to the self-service counter server 50. After that, in the same method as the authentication request, the self-service counter server 25 generates an input message of the transaction request and the input message is sent to the host computer via the telephone banking server 26 and the communication server 27. Then, the host computer processes a received input message and sends an output message as a result of the input message to the telephone banking server 26 via the communication server 27. The telephone banking server 26 generates a response file in accordance with the output message. Subsequently, when the self-service counter server 25 receives the response file sent from the telephone banking server 26, the self-service counter server 25 generates a response showing a transaction result and sends the response to the self-service counter terminal unit 10 via the public switching telephone network 50.

When receiving the transaction result, the self-service counter terminal unit 10 displays the transaction result in accordance with a predetermined screen format. For example, in the account balance inquiry transaction, a customer's current account balance is displayed. Also, in the account transfer inquiry transaction, a message that an indicated amount of money is transferred to an indicated bank account is displayed.

Figure 4:
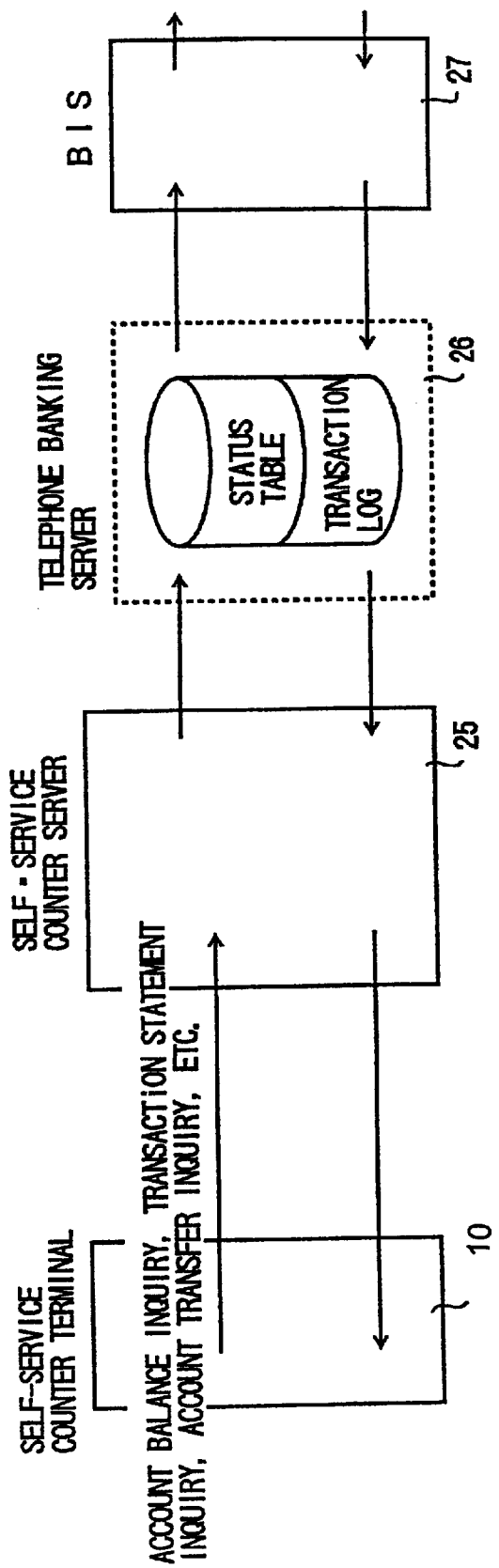
FIG. 4 is a diagram showing flow and accumulation of information related to a transaction.

In the process mentioned above, for example, as shown in FIG. 4, the transaction request, which is any one of the balance inquiry request, the transfer inquiry request, the transaction statement request or the like, is output from the self-service counter terminal unit 10 based on an input operation by the customer. The transaction request is converted into the input message of the transaction request in the self-service counter server 25. Every time when the input message is relayed to the telephone banking server 26, the input message is accumulated as the transaction data in the transaction log stored in the telephone banking server 26. In addition, every time when the output message is supplied from the communication server 27 to the telephone banking server 26 because the host computer sends the output message as a transaction result of the transaction request, the output message is also accumulated as the transaction data in the transaction log stored in the telephone banking server 26.

For example, the transaction log is structured as shown in FIG. 5.

In the transaction log in FIG. 5, information "LOG_INFO" derived from the input information at the self-service counter terminal unit 10 is stored while corresponding to a telephone number "TEL_NO" of the customer telephone 12 that is located together with the self-service counter terminal unit 10. In addition, for each information "LOG_INFO", the following data is stored as one transaction data: the count number of today's transactions "TRAN_CNT", an update "UPDATE", an updated time "UPDTTIME" and a transaction log type "LOG_TYPE" indicating '01' showing a request message from the self-service counter terminal unit 10 or '02' showing a response message from the host computer. It should be noted that the count number of today's transactions "TRAN_CNT" is incremented by one at every transaction so as to show the number of transactions while the self-service counter terminal unit 10 is used.

Also, in the process mentioned above, the self-service counter terminal unit 10 is operated by the customer. When a screen of the self-service counter terminal unit 10 is changed by a customer's operation, information of a screen status is sent to the transaction support system via the public switching telephone network 50 (Refer to a screen information notification in FIG. 3). The information is supplied to the telephone banking server 26 via the self-service counter server 25. In the telephone banking server 26, the information of the screen status is stored in the status table. The information of the screen status is stored in the status table with the telephone number of the customer telephone, which is located together with the self-service counter terminal unit 10 displaying the screen. Thus, the information corresponds to the telephone number.

The status table is, for example, structured as shown in FIG. 6.

In FIG. 6, the telephone number of the customer telephone located with each self-service counter terminal unit 10 is stored with a screen ID identifying one of screen images. All information about the screen images is stored in a screen image database (not shown) with identical screen IDs, respectively. Also, in the status table, the following items are stored with the telephone number and the screen ID: a terminal number for the host computer to identify the self-server counter terminal unit 10, a location number and a location name to indicate a location of the self-service counter terminal unit 10, a machine number, an operation start date, a transaction counter, a line status flag (FGL) to show whether a line of the customer telephone is busy, current transaction information about a customer's account and so on, an updated date, and an updated time.

A part of a transaction process, which is executed by the control unit 101 at each reception terminal unit, will now be explained according to the present invention with reference to FIGS. 7 and 8.

It is assumed that the customer at the self-service counter terminal unit 10 has a question about an operation of the self-service counter terminal unit 10 and then calls an operator as a customer service representative from the customer telephone 12 to ask about the operation. In this case, a customer's call from the customer telephone 12 is transmitted to the exchange 21 via the public switching telephone network 50. Then, for example, the automatic call distributor (ACD) of the exchange 21 in FIG. 2 may distribute the call to the reception terminal unit 22a.

Figure 7:
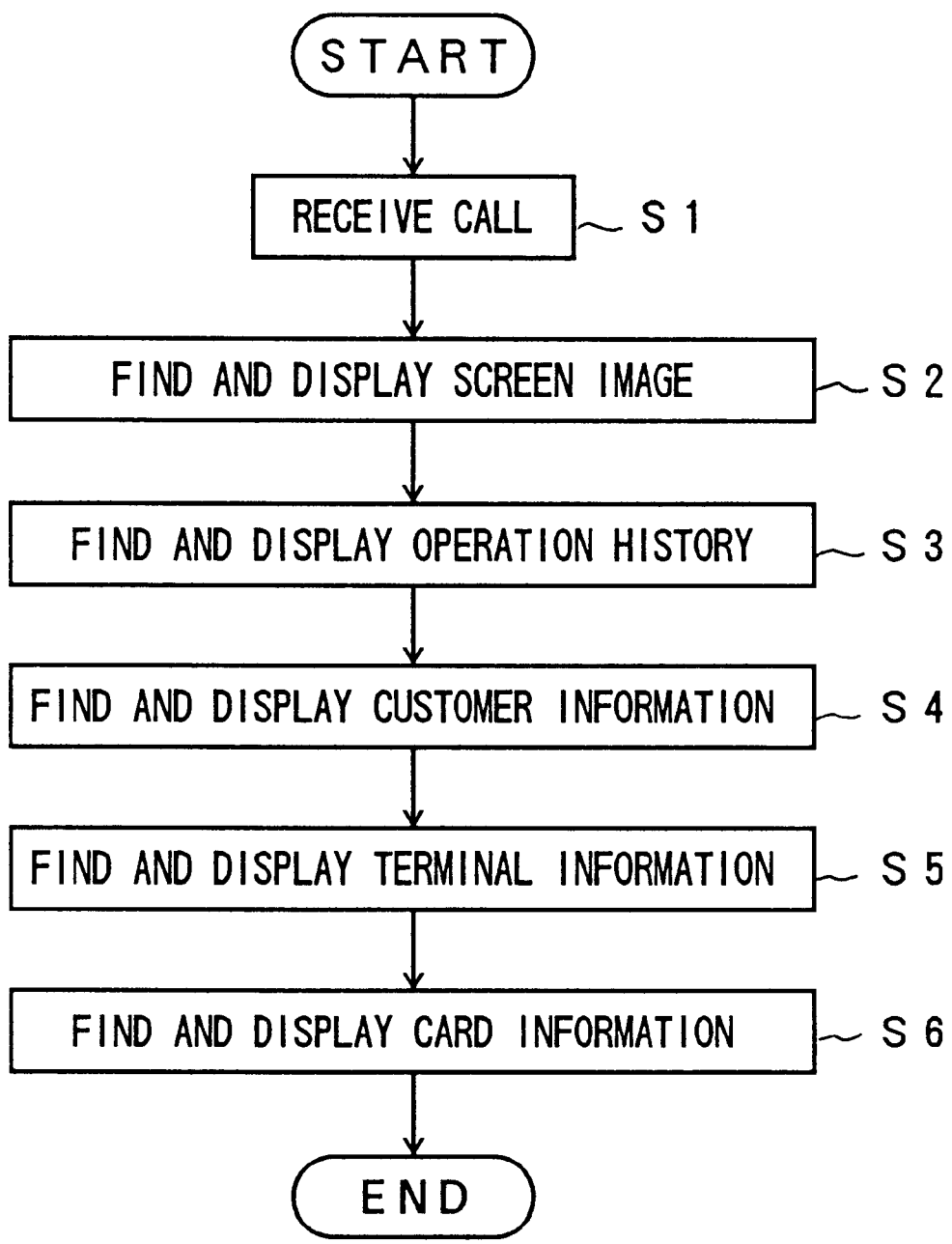
FIG. 7 is a flowchart diagram explaining a part of a transaction process, which is executed in a reception terminal unit.

In FIG. 7, the reception terminal unit 22a receives the call from the customer telephone 12 in step S1. As a result, an operator at the reception terminal unit 22a becomes ready to communicate with the customer by using the telephone head set 11.

In step S1, when the reception terminal unit 22a receives the call from the customer telephone 12, simultaneously, the reception terminal unit 22a receives the telephone number of the customer telephone 12 supplied by the public switching telephone network 50 by such as a number display service. Then, the received telephone number is stored temporarily in a register in the memory unit 102. As shown in FIG. 8 with a solid line, the screen ID (Refer to FIG. 6) corresponding to the telephone number is searched for from the status table in the telephone banking server 26 by using the received telephone number as a key in step S2. Subsequently, in step S2, screen image information identified by the screen ID is retrieved from the screen image database and displayed at the display unit 103 of the reception terminal unit 22a shown in FIG. 2.

Information identifying the customer telephone 12 may be identically defined by the transaction support system. However, in the case of using the public switching telephone network 50, the telephone number is preferably used because the telephone number can be easily obtained from the public switching telephone network 50 by using the number display service that is a service to notify a receiver of a telephone number of a caller.

In step S3, the transaction data as an operation history of the customer is searched for and retrieved from the transaction log in accordance with the telephone number, the biggest count number of today's transactions "TRAN_CNT" which means the latest transaction and the transaction log type "LOG_TYPE". Then, the operation history is displayed at the display unit 103 of the reception terminal unit 22a.

In step S4, customer information including an address, a name, an account number, a transaction condition for the account and so on is retrieved from the host computer via the telephone banking server 26 and the communication server 27 in accordance with the information that is retrieved from the card of the customer and identifies the customer. Then, the customer information is displayed at the display unit 103 of the reception terminal unit 22a.

Thereafter, self-service counter terminal information including the location number, the location name, the machine number and so on is searched for from the status table by using the telephone number stored in the register in the memory unit 103 as a key. Then, the self-service counter terminal information is retrieved from the status table and displayed at the display unit 103 of the reception terminal unit 22a in step S5.

Furthermore, card information including a result of authentication, a term of validity, an account number and so on is retrieved from the host computer via the telephone banking server 26 and the communication server 27 and displayed at the display unit 103 of the reception terminal unit 22a in step S6.

Figure 9:
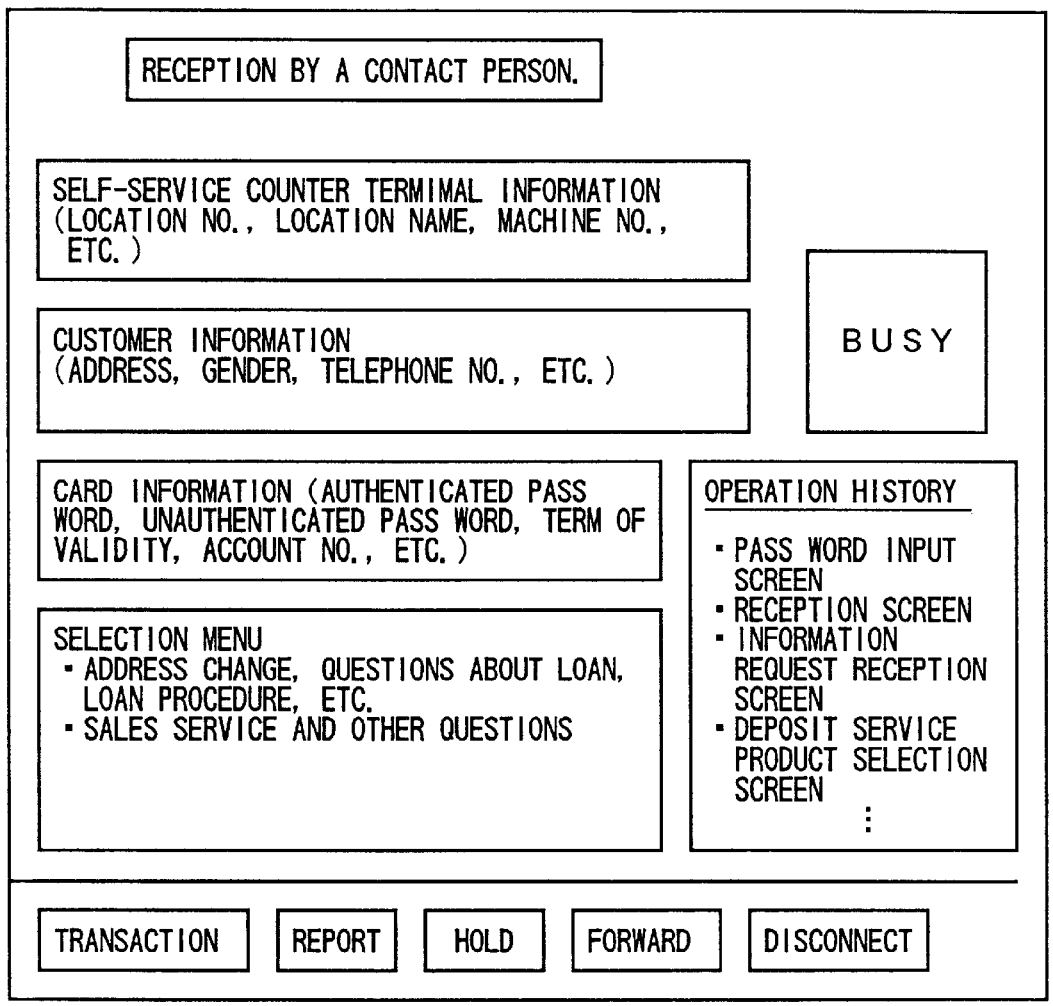
FIG. 9 is a diagram showing an example of a screen displayed at the reception terminal unit.

Accordingly, the display unit 103 at the reception terminal unit 22a, which received the call from the customer telephone 12 located with the self-service counter terminal unit 10, shows a current screen of the self-service counter terminal unit 10 as shown in FIG. 9. That is, the current screen displayed at the display unit 103 includes the self-service counter terminal information processed in step S5, the customer information processed in step S4, the card information processed in step S6, the screen image information processed in step S2 and the operation history processed in step S3. After that, the part of the transaction executed by the control unit 101 is terminated.

As can be seen from the example of the screen at the reception terminal unit 22a, information concerning the self-service counter terminal unit 10, including the screen image and accumulated information such as an operation history, can be displayed with the other information in one screen displayed at the reception terminal unit 22a.

In addition, a connection between the reception terminal unit 22a and the customer telephone 12 located together with the self-service counter terminal unit 10 is monitored by the reception terminal unit 22a and connection information indicating whether the customer telephone 12 is connected to the reception terminal unit 22a is transmitted to the telephone banking server 26 (Refer to FIG. 3). In accordance with the connection information, the line status flag in the status table in the telephone banking server 26 is controlled. For example, when the reception terminal unit 22a is already connected to the customer telephone 12, the line status flag is "1". Conversely, when the reception terminal unit 22a is already disconnected from the customer telephone 12, the line status flag is "0".

In the reception terminal unit 22a, the line status flag in the status table is referred to and displayed as "BUSY" as shown in FIG. 9.

In a state in which the operator at the reception terminal unit 22a is able to communicate with the customer via a telephone, when the customer asks the operator about the operation of the self-service counter terminal unit 22a, the operator can see the same screen as that displayed at the self-service counter terminal unit 22a. Therefore, it is possible for the operator to quickly understand about the current screen of the self-service counter terminal unit 22a and explain about the operation related to a customer's desired transaction without asking the customer a current status of the self-service counter terminal unit 22a.

Figure 8:
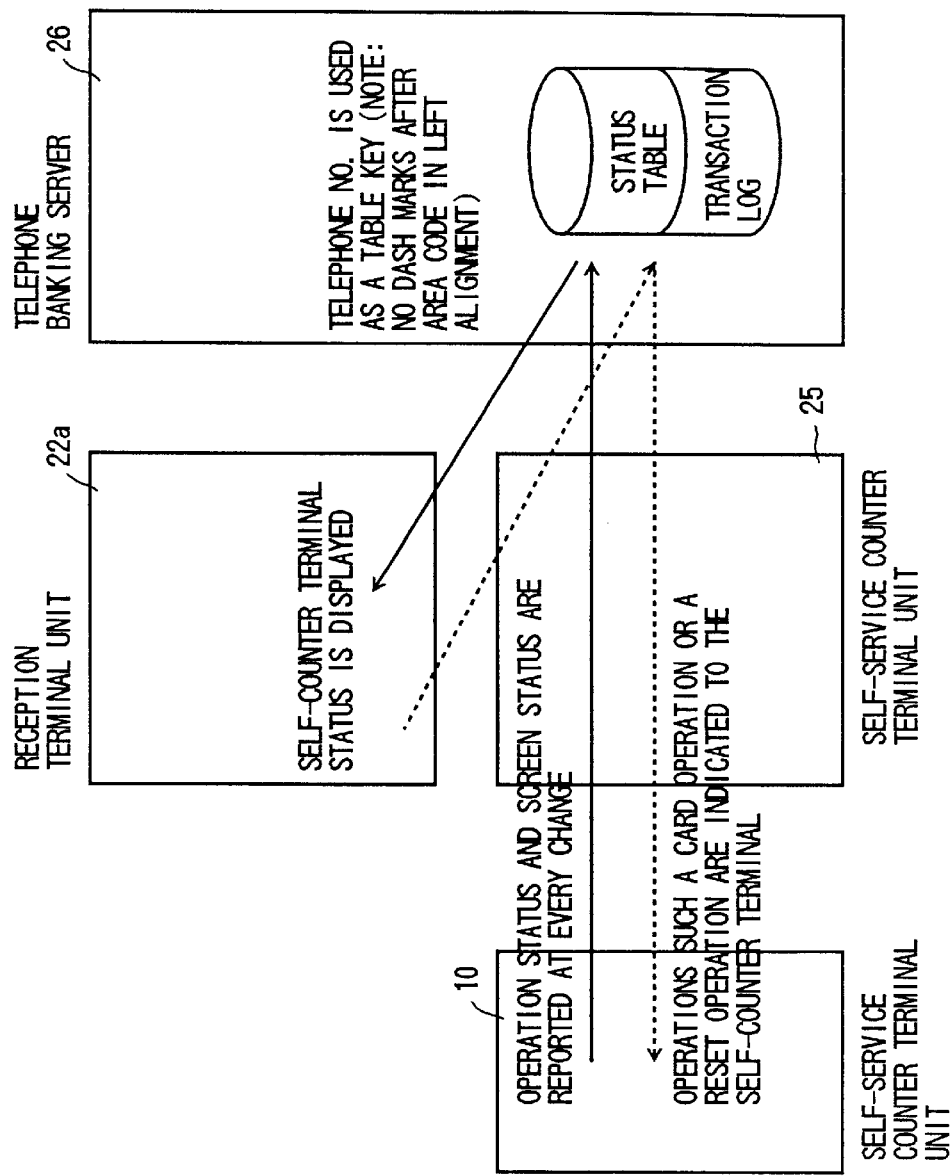
FIG. 8 is a diagram showing information flow between the self-service counter terminal unit and the transaction support system.

As shown in FIG. 8 with dotted lines, an operation instruction such as a card operation, a reset operation or the like can be performed from the reception terminal unit 22a to the self-service counter terminal unit 10.

Also, in a case in which the customer consults with the operator about a transaction by using the customer telephone 12, the operator can confirm that day's transactions of the customer by referring to the operation history displayed at the display unit 103. Moreover, the operator can confirm information of the customer by referring to the customer information displayed at the display unit 103. Therefore, it is possible to quickly respond to the customer.

In addition, in the screen in FIG. 9, a "FORWARD" function is provided to forward a call of the customer telephone 12 to a specialized division an inside bank or an outside bank. That is, in a case in which expertise is needed to counsel the customer, the operator forwards the call of the customer telephone 12 to the specialized division for the customer. In this case, the information such as a password or the like to identify the customer, the customer information including personal information, the operation history and so on, which are obtained at the reception terminal unit 22a, are also forwarded to the specialized division. Therefore, it can be realized that the customer can consult with the expert in the specialized division on a telephone. Moreover, it can be realized that the expert can quickly respond to the customer's questions by referring to information concerning the customer displayed at the expert's terminal unit.

It is preferable that the specialized division be located in a bank, a securities company, a life insurance company, an investment bank or the like. Thus, a high-quality service can be provided to the customer.

A result of counseling the customer at the specialized division may be reported to the transaction support system according to the present invention. In the transaction support system, the reported result can be accumulated in the host computer.

As mentioned above, the self-service counter terminal unit 10 located at such as a convenience store, a train station or the like includes a function for accumulating journal information.

After the authentication, transaction information and customer information that are processed in the self-service counter terminal unit 10 are stored and accumulated as journal information in a recording medium such as a memory, a disk or the like. At a predetermined timing, accumulated journal information is transmitted to the host computer via the public switching telephone network 50 and the transaction support system. In the host computer when a predetermined process, for example, a storing process for the journal information coming from the self-service counter terminal unit 10, is completed, a message showing that the process is completed is sent to reply to the self-service counter terminal unit 10 via the transaction support system and the public switching telephone network 50. In the self-service counter terminal unit 10, when the message is received, the journal information corresponding to the message is deleted from the recording medium.

For example, the journal information can be provided to the host computer connecting to the transaction support system and used to manage transactions.

In addition, in FIG. 3, a telecommunication confirmation request is sent from the self-service counter terminal unit 10 to the telephone banking server 26 via the self-service counter server 25 in order to check whether a telephone line for the customer telephone is connected. Then, the communication status flag corresponding to the telephone number of the customer telephone 12 in the status table is retrieved and a telecommunication confirmation response including a status of the communication status flag is sent from the self-service counter server 25 to the self-service counter terminal unit 10. It is assumed that the communication status flag "0" shows that the telephone line is disconnected and the communication status flag "1" shows that the telephone line is connected.

When the communication status flag is changed from "0" (disconnected) to "1" (connected), a telecommunication start notification is sent from the self-service counter server 25 to the self-service counter terminal unit 10. In the same manner, when the communication status flag is changed from "1" (connected) to "0" (disconnected), a telecommunication end notification is sent.

The present invention is not limited to the specifically disclosed embodiments, variations and modifications, and other variations and modifications may be made without departing from the scope of the present invention.

The present application is based on Japanese Priority Application No. 10-345954 filed on Dec. 4, 1998, the entire contents of which are hereby incorporated for reference.

What is claimed is:

1. A transaction support system connected to at least one transaction terminal unit through one line and separately connected to at least one telephone provided together with the transaction terminal unit through another line, said transaction support system comprising:

an information generating part generating transaction and terminal information concerning a transaction performed in the transaction terminal unit, the transaction and terminal information including telephone information identifying the telephone;

an information storing part storing the transaction and terminal information generated by said information generating part;

a retrieving part retrieving the transaction and terminal information including the telephone information, which is supplied by a public switched telephone network, from said information storing part, when a call from the telephone is received; and a displaying part, separate from the transaction terminal unit, displaying the transaction and terminal information retrieved by said retrieving part.

2. A transaction support system connected to at least one transaction terminal unit through one line and separately connected to at least one telephone provided together with the information terminal unit through another line, said transaction support system comprising:

an information generating part generating transaction and terminal information concerning a transaction performed in the transaction terminal unit, the transaction and terminal information including telephone information identifying the telephone;

an information storing part storing the transaction and terminal information generated by said information generating part; and a displaying part, separate from the transaction terminal unit, displaying the transaction and terminal information corresponding to the telephone stored by the information storing part, when a call from the telephone is received, wherein said information storing part comprises a process database for accumulating the transaction and terminal information including the telephone information when the transaction and terminal information concerns a process performed at the transaction terminal unit based on input information that is input to the transaction terminal unit and includes information reflective of commands input to the transaction terminal unit and messages output to the transaction terminal unit so that said displaying part displays the transaction and terminal information accumulated by said process database when the call from the telephone is received.

3. A transaction support system connected to at least one transaction terminal unit through one line and separately connected to at least one telephone provided together with the information terminal unit through another line, said transaction support system comprising:

an information generating part generating transaction and terminal information concerning a transaction performed in the transaction terminal unit, the transaction and terminal information including telephone information identifying the telephone;

an information storing part storing the transaction and terminal information generated by said information generating part; and a displaying part, separate from the transaction terminal unit, displaying the transaction and terminal information corresponding to the telephone stored by the information storing part, when a call from the telephone is received, wherein said information storing part comprises a terminal state database for storing the transaction and terminal information corresponding to the telephone information when the transaction and terminal information includes terminal state information showing a state being provided to a customer at the transaction terminal unit so that said displaying part displays the terminal state information when the call from the telephone is received.

4. The transaction support system as claimed in claim 3, wherein said displaying part displays a current screen image of the transaction terminal unit when said terminal state information includes information concerning a current screen image displayed at the transaction terminal unit.

5. A transaction support system connected to at least one transaction terminal unit through one line and separately connected to at least one telephone provided together with the information terminal unit through another line, said transaction support system comprising:

an information generating part generating transaction and terminal information concerning a transaction performed in the transaction terminal unit, the transaction and terminal information including telephone information identifying the telephone;

an information storing part storing the transaction and terminal information generated by said information generating part;

a forwarding part forwarding the transaction and terminal information and a call from the telephone, the transaction and terminal information corresponding to the telephone information of the telephone provided at the transaction terminal unit, to a different terminal unit and a different telephone located together therewith, so that the transaction and terminal information is displayed at the different terminal and the call is connected to the different telephone simultaneously; and a displaying part, separate from the transaction terminal unit, displaying the transaction and terminal information corresponding to the telephone stored by the information storing part, when the call from the telephone is received.

6. The transaction support system as claimed in claim 1, wherein said telephone information is a telephone number.

7. A transaction support method, comprising:

recording progressive transaction information, terminal information, and screen information, responsive to a transaction being progressively processed at a transaction terminal having a screen display and a telephone;

retrieving the recorded progressive transaction information, terminal information, and screen information associated with the transaction terminal as indicated by the terminal information, responsive to a service call made from the transaction terminal's telephone during the processing of the transaction;

forwarding the retrieved progressive transaction information, terminal information, and screen information to a service terminal having a telephone;

displaying, at the service terminal, the retrieved and forwarded progressive transaction information, terminal information, and screen information; and displaying, at the service terminal, a reproduction of the transaction terminal screen display, in accordance with the retrieved and forwarded progressive transaction information, terminal information, and screen information, while at a same time connecting the service call to the service terminal's telephone.

8. A transaction support method for supporting a transaction system connected to at least one transaction terminal unit through one line and separately connected to at least one telephone provided together with the transaction terminal unit through another line, the method comprising:

recording transaction information describing a transaction at the transaction terminal responsive to the transaction being progressively processed at the transaction terminal having a screen display and the telephone;

automatically retrieving, based on telephone information supplied by a public switched telephone network, the transaction information associated with the transaction terminal, where the automatic retrieving is responsive to a voice call made from the telephone provided at the transaction terminal;

forwarding the automatically retrieved transaction information to a service terminal having a telephone; and displaying, at the service terminal, the transaction information.

9. The method as claimed in claim 8, further comprising displaying, at the service terminal, a reproduction of the transaction terminal screen display based on the transaction information.

10. The method as claimed in claim 8, further comprising connecting, substantially simultaneously with said displaying, the call to the telephone provided at the service terminal.

11. The method as claimed in claim 8, further comprising connecting, substantially simultaneously with said displaying, the call to the telephone provided at the service terminal, and wherein said displaying further comprises displaying, at the service terminal, a reproduction of the transaction terminal screen display based on the transaction information.

* * * * *